United States Patent [19]

Traver

[11] Patent Number: 5,175,058
[45] Date of Patent: Dec. 29, 1992

[54] PRESSURE SENSITIVE ADHESIVES

[75] Inventor: Frank J. Traver, Troy, N.Y.

[73] Assignee: General Electric Company, Waterford, N.Y.

[21] Appl. No.: 802,101

[22] Filed: Dec. 4, 1991

Related U.S. Application Data

[62] Division of Ser. No. 529,994, May 29, 1990, Pat. No. 5,096,981.

[51] Int. Cl.⁵ .............................................. B32B 9/04
[52] U.S. Cl. .................................. 428/447; 428/448; 525/477
[58] Field of Search ................. 525/477; 428/447, 448

[56] References Cited

U.S. PATENT DOCUMENTS

| | | | |
|---|---|---|---|
| 4,882,377 | 11/1989 | Sweet et al. | 524/267 |
| 4,925,671 | 5/1990 | Abber | 424/448 |
| 4,929,703 | 5/1990 | Narula et al. | 528/23 |

Primary Examiner—John C. Bleutge
Assistant Examiner—Margaret W. Glass

[57] ABSTRACT

A composition suitable for forming a pressure sensitive adhesive is provided comprising a homogeneous mixture of two intermediate pressure sensitive adhesive compositions. The pressure sensitive adhesives formed by curing this composition have improved peel strength and adhesion properties.

8 Claims, No Drawings

PRESSURE SENSITIVE ADHESIVES

This application is a division of application Ser. No. 07/529,994, filed May 29, 1990, now U.S. Pat. No. 5,096,981.

BACKGROUND OF THE INVENTION

This invention relates to pressure sensitive adhesives. More particularly, this invention relates to pressure sensitive adhesives containing a blend of intermediate pressure sensitive adhesives.

The term, pressure sensitive adhesive, as used herein, refers to adhesives that can be adhered to a surface and yet can be stripped from the surface without transferring more than trace quantities of adhesive to the surface, and then can be readhered to the same or another surface because the adhesive retains some or all of its tack and adhesive strength.

Silicone pressure sensitive adhesive (PSA) compositions are known in the art. Reference is made, for example, to U.S. Pat. Nos. 2,857,356; 2,736,721; 2,814,601; 4,831,080; 4,882,377; and 4,309,520.

U.S. Pat. No. 2,676,182 (Daudt et al.) discloses a method for preparing a resin copolymer containing M and Q units and soluble in aromatic solvents, wherein a silica hydrosol is reacted under acidic conditions with organosubstituted siloxanes.

U.S. Pat. No. 2,736,721 (Dexter) discloses a pressure sensitive adhesive composition and method of preparing it, the composition comprising 5 to 70 per cent by weight of a benzene soluble copolymer and 95 to 30 per cent by weight of a benzene soluble organosiloxane.

U.S. Pat. No. 2,814,601 (Currie et al.) discloses a pressure sensitive adhesive containing 40 to 75% by weight of a benzene soluble resin copolymer and 25 to 60% by weight of a hydroxy end-blocked diorganopolysiloxane fluid. This patent is cited in the instant application because of its disclosure of a method for preparing polydiorganosiloxanes.

U.S. Pat. No. 2,857,356 (Goodwin) discloses a pressure sensitive adhesive composition prepared from the intercondensation of a mixture containing (1) a cohydrolysis product of a trialkyl hydrolyzable silane and alkyl silicate and (2) a linear, high viscosity organopolysiloxane fluid containing terminal silicon-bonded hydroxy groups.

U.S. Pat. No. 4,309,520 (Blizzard) discloses a pressure sensitive adhesive containing a resin, polymer, and a cluster compound.

U.S. Pat. No. 4,882,377 (Sweet et al.) discloses a pressure sensitive silicone elastomer composition containing (I) a silicone pressure sensitive adhesive composition containing from 35 to 70 parts by weight of a benzene-soluble resinous copolymer and from 30 to about 65 parts by weight of a polydiorganosiloxane, (II) a crosslinkable silicone elastomer, and (III) a viscosity reducing agent.

U.S. Pat. No. 4,831,080 (Blizzard et al.) discloses a pressure sensitive adhesive composition prepared by reacting (I) a pressure sensitive adhesive; (II) a liquid organohydrogenpolysiloxane; (III) the pressure sensitive adhesive of component I; and (IV) a cure agent for the liquid U.S. Pat. No. 4,906,695 (Blizzard et al.) a pressure sensitive adhesive prepared by reacting a first component containing a pressure sensitive adhesive and an alkoxy-functional silicon compound with a second component containing the pressure sensitive adhesive of component I and a cure agent for the alkoxy-functional silicon compound.

Silicone pressure sensitive adhesives are widely employed in a variety of uses, including as pressure-sensitive tapes. Silicone pressure-sensitive adhesives exhibit excellent adhesion to very low energy surfaces, have excellent weatherability, are flexible at low temperature and are chemically stable at very high temperatures.

Although many silicone-based pressure-sensitive adhesives are known in the art, it is continually desired to provide improved pressure sensitive adhesives having superior peel strength, consistently high tack, and increased high-temperature performance. The composition of this invention provides improved silicone pressure-sensitive adhesives having these desirable properties.

SUMMARY OF THE INVENTION

The present invention is based on the discovery that a first pressure sensitive adhesive prepared from two different pressure sensitive adhesive intermediates each containing MQ resin in critical amounts will have superior peel strength and adhesion properties over a second pressure sensitive adhesive prepared from a single PSA composition having an amount of MQ resin equivalent to that of the average amount of MQ resin present in the two intermediate PSAs used to prepare the first pressure sensitive adhesive.

The present invention provides a composition suitable for forming a pressure sensitive adhesive having improved peel strength and adhesion properties, comprising a homogeneous mixture of:

I. about 50 to about 95 parts by weight of a first pressure sensitive adhesive composition comprising by weight:
  (A) about 49 to about 57% of a solid, benzene soluble resin copolymer consisting essentially of $R_3SiO_{\frac{1}{2}}$ units and $SiO_{4/2}$ units where each R individually is a monovalent hydrocarbon radical containing no more than six carbon atoms, there being from 0.6 to 0.9 inclusive $R_3SiO_{\frac{1}{2}}$ units for every $SiO_{4/2}$ units, at least 95 percent of all R radicals in I(A) being methyl and the total number of R radicals that have olefinic unsaturation being 0–0.5 percent of all R radicals in I(A), and
  (B) about 43 to about 51% of a hydroxyl end-blocked diorganopolysiloxane having the formula $$HO-(R^1{}_2SiO)_x-H$$

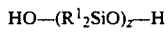

wherein each $R^1$ individually is a radical selected from the group consisting of methyl, ethyl, vinyl, and phenyl, at least 95 percent of all $R^1$ radicals being methyl, the viscosity of the polydiorganosiloxane I(B) having a value of from about 100,000 to about 500,000,000 centipoises at 25° C., the total of I(A) and I(B) being 100 parts by weight; and II. about 5 to about 50 parts by weight of a second pressure sensitive adhesive composition comprising by weight:
  (A) about 64 to about 74% of a solid, benzene soluble resin copolymer consisting essentially of $R_3SiO_{\frac{1}{2}}$ units and $SiO_{4/2}$ units where each R individually is a monovalent hydrocarbon radical containing no more than six carbon atoms, there being from 0.6 to 0.9 inclusive $R_3SiO_{\frac{1}{2}}$ units for every $SiO_{4/2}$ units, at least 95 percent of all R radicals in II(A) being methyl and the total number of R radicals that have olefinic unsaturation being 0–0.5 percent of all R radicals in II(A), and (B) about 26 to about 36% of a hydroxyl end-blocked diorganopolysiloxane having the formula $$HO-(R_2^1SiO)_x-H$$

wherein each $R^1$ individually is a radical selected from the group consisting of methyl, ethyl, vinyl, and phenyl, at least 95 percent of all $R^1$ radicals being methyl, the viscosity of the polydiorganosiloxane II(B) having a value of from about 100,000 to about 500,000,000 centipoises at 25° C., the total of (II)(A) and (II)(B) being 100 parts by weight.

Other aspects of the present invention are directed to pressure sensitive adhesives formed from the composition of this invention, as well as to articles containing the pressure sensitive adhesive of this invention.

The pressure sensitive adhesive of this invention has an average peel strength value of about 40 ounces/inch, as measured on a 1-mil polyester film, and a tack adhesion in the range of 750–1000 grams/cm². In addition, tapes containing the pressure sensitive adhesive of this invention exhibit significantly reduced residue (i.e., "ghosting") upon removal of the tapes from surfaces on which they have been applied.

DETAILED DESCRIPTION OF THE INVENTION

The present invention is directed to a pressure sensitive adhesive composition comprising a homogeneous blend of two intermediate pressure sensitive adhesive compositions. Each of the intermediate pressure sensitive adhesive compositions, i.e., components (I) and (II), used in the present invention contains a benzene-soluble resinous copolymer and a linear hydroxyl end-blocked polydiorganosiloxane.

The resinous copolymer of components (I)(A) and (II)(A) of the composition of this invention is composed of $R_3SiO_{\frac{1}{2}}$ units (M units) and $SiO_{4/2}$ units (Q units). The R groups in the M units may be identical or different and are monovalent hydrocarbon radicals containing no more than six carbon atoms such as alkyl radicals, e.g., methyl, ethyl, and isopropyl; cycloaliphatic radicals, e.g., cyclopentyl and cyclohexenyl; olefinic radicals, e.g., vinyl and allyl; and the phenyl radical. It is preferred that at least 95 percent, and most preferably 100%, of all the R radicals in the resinous copolymer are methyl and that essentially all of the radicals are free of olefinic unsaturation. About 0 to up to 0.5 percent of all R radicals in the copolymer can be olefinically unsaturated, such as with the vinyl radical. More preferably the number of unsaturated R radicals can range from 0 to 0.2 percent of all R radicals in the copolymer.

The Q units in the resinous copolymer are essentially all siloxane units, containing no silicon bonded carbon atoms and are derived directly from the silica hydrosol used in the preferred method of preparation, as described hereinbelow.

Resin copolymers that are operable in the invention are soluble in aromatic solvents such as benzene, toluene, xylene and the like and have a ratio of M units to Q units of from 0.6:1.0 to 0.9:1.0.

The resinous copolymer can be prepared by any of the known methods for preparing such resins. For example, cohydrolysis of an appropriate amount of each of the silanes of the formulae $$R_3SiX \text{ and } SiX_4$$

to give M units and Q units respectively in the desired M/Q ratio in the resin copolymer can be used when X is a hydrolyzable group such as alkoxy. Preferably, the resin copolymer is prepared by the method of Daudt et al., U.S. Pat. No. 2,676,182, which is hereby incorporated by reference. Briefly, the method of Daudt et al. comprises reacting under acidic conditions, a silica hydrosol with organosubstituted siloxanes, for example, hexamethyldisiloxane, or hydrolyzable organosubstituted silanes, for example, trimethylchlorosilane, or their mixtures and recovering a resin copolymer having M and Q units which is soluble in aromatic solvents.

The hydroxyl end-blocked polydiorganosiloxane of components (I)(B) and (II)(B) of the composition of this invention is a linear organopolysiloxane fluid having a viscosity of about 100,000 to about 500,000,000; 20,000,000 to about 200,000,000; and most preferably about 40,000,000 to about 100,000,000; centipoise at 25° C. The polydiorganosiloxane can be represented by the general formula:

$$HO-(R_2^1SiO)_x-H$$

wherein each $R^1$ individually is a radical selected from the group consisting of methyl, ethyl, vinyl, and phenyl, at least 95 percent, and most preferably 100%, of all $R^1$ radicals being methyl.

Most preferably, component II is a silanol-stopped polydimethylsiloxane.

The polydiorganosiloxanes can be prepared by any of the methods known in the art. For example, the polydiorganosiloxanes can be prepared according to the method disclosed in U.S. Pat. No. 2,814,601, herein incorporated by reference, wherein an appropriate siloxane is reacted with an aqueous acid in a closed system until the viscosity of the siloxane has become essentially constant. The product is then washed free of acid.

Component (I) contains about 49 to about 57%, preferably about 51 to about 55%, and most preferably about 53%, of the resinous copolymer and about 43 to about 51%, preferably about to about 49%, and most preferably about 47% of the polydiorganosiloxane. Component (II) contains about 64 to about 74%, preferred about 67 to about 71%, and most preferably about 69%, of the resinous copolymer and about 26 to about 36%, preferably about 29 to about 33%, and most preferably about 31%, of the polydiorganosiloxane.

Components I and II can be prepared by heating to reflux e.g., at a temperature of 130° C., and cooking for about two to three hours a mixture of the resin, polymer and an organic solvent in the presence of a base catalyst. The water formed during the condensation reaction is then removed. The resulting mixture is cooled, its solids content is adjusted, and the mixture is neutralized with acid.

The organic solvent used in the preparation of components I and II can be any of the solvents conventionally used with organosilanes and having a boiling point below approximately 250° C., such as aromatic hydrocarbons, e.g., benzene, toluene, and xylene; aliphatic hydrocarbons, e.g., hexane, heptane, and cyclohexane; and halogenated hydrocarbon solvents, e.g., trichloroethane and chloroform.

Suitable base catalysts for preparing the PSAs of components I and II include, for example, alkali metal hydroxides, e.g., sodium hydroxide, potassium hydroxide and the like; an aminofunctional silanes such as those disclosed in U.S. Pat. No. 4,906,695 to Blizzard et al., which is hereby incorporated by reference. Suitable aminofunctional silanes include, for example N-gamma-aminopropyltriethoxysilane, N-beta-aminoethyl-gamma-amino-isobutyltrimethoxysilane, and N-beta-aminoethyl-gamma-aminopropyltrimethoxysilane.

The preferred catalyst is sodium hydroxide, preferably in the form of an aqueous solution. The amount of base catalyst should be in the range of about 10 to about 30 ppm, preferably about 20 ppm, based on the combined weight of the resin and polymer.

Suitable acids for neutralizing the condensed mixture include mineral acids, such as hydrochloric acid, phosphoric acid, and the like, and organic acids such as acetic acid, acetyl chloride, and the like.

The composition of this invention comprises about 50 to about 95 parts by weight, preferably about 60 to about 90 parts by weight, and most preferably about 70 to about 80 parts by weight, of the pressure sensitive adhesive composition of component (I); and about 5 to about 50 parts by weight, preferably about 10 to about 40 parts by weight, and most preferably about 20 to about 30 parts by weight, of the pressure sensitive adhesive composition of component (II).

Preferably, the composition of this invention further comprises (III) a rare earth metal salt of a fatty acid. This component acts to improve the high temperature adhesive performance of the pressure-sensitive adhesive of this invention.

Examples of rare earth metals suitable for forming the salt include cerium, lanthanum, praseodymium, and the like. The preferred rare earth metal cerium.

The fatty acid preferably contains about 6 to about 18 carbon atoms, most preferably about 8 carbon atoms. Thus, the preferred rare earth metal salt for use in the present invention is cerium octoate.

Generally, rare earth metal salt can be used in the composition of this invention in an amount sufficient to provide the composition with an amount of rare earth metal within the range of from about 10 to about 100, preferably from about 15 to about 60, and most preferably, about 20 to about 30 parts per million, based on the combined weight of components I and II.

Typically, the rare earth metal salt is used in the composition of this invention in the form of a 30% solution, 6% of which is composed of the active rare earth metal. Examples of suitable solvents for the rare earth metal solution incude, for example, hexane, heptane, toluene, xylene, mineral spirits and ketones.

The pressure-sensitive adhesive of the present invention is prepared by merely mixing components I-II or I-III. This may be accomplished by any suitable means but in general it is preferable to employ a mutual solvent such as an aromatic and aliphatic hydrocarbon solvent.

The rare earth metal salt is added to component I or a mixture of component I and solvent slowly in increments with agitation to get proper dispersion. Because rare earth metal salt is a base scavenger, it is necessary that the component I or the component I/solvent mixture be neutral or slightly acid before the rare earth metal salt is added; otherwise, component I or the component (I)/solvent mixture will be neutralized.

Components I-II or components I-III are blended until a uniform, homogeneous mixture is formed. They can be mixed using any of the techniques known in the polymer art, such as milling, blending, stirring, and the like, either in batch or in continuous process.

As soon as the ingredients are mixed the composition is ready for use as a pressure-sensitive adhesive without further treatment. It is simply applied by any suitable means to the surfaces to be adhered and the surfaces are then brought together. If the adhesive is in solvent, it is best to allow the solvent to evaporate before adhering the surfaces.

The adhesive composition is applied to the surface of the substrate in any convenient manner such as by dipping the base member in the solution or by brushing or spraying the solution on the surface.

If desired, the coating may be cured for a short time before use, e.g., at 160°-177° C. for about 2 minutes, although this curing step is not essential. Likewise one may if desired, employ a catalyst to assist in the curing. Examples of suitable catalysts include any of the well-known silicone curing catalysts, such as, for example, benzoyl peroxide, dichlorobenzoyl peroxide and di-t-butyl peroxide, and azo compounds, e.g., azo-bis-isobutyronitrile; silanol-condensing catalysts, e.g., salts of heavy metals, such as dibutyltin diacetate and stannous octoate; hydrosilyation catalysts, e.g., platinum-containing catalysts, such as chloroplatinic acid and platinum on charcoal; and lead, zinc, or tin naphthenates The amount of adhesive material which is applied to surfaces may be varied to fit particular circumstances. Ordinarily, sufficient adhesive should be applied to render the surface definitely tacky to the touch after the removal of any solvent. After applying it to the surface, the adhesive may be cured by air drying or by heating at temperatures ranging up to 300° C. Heating will hasten removal of the solvent and also tends to increase the cohesive strength of the adhesive film. After curing, the surfaces to be adhered are brought together. No further curing is needed in order to establish a firm bond between them.

Small amounts of additional ingredients can be added to the composition of this invention if desired. For example, antioxidants, pigments, stabilizers, fillers, and the like, can be added as long as they do not materially reduce the pressure sensitive adhesive properties of the composition.

The compositions of this invention are useful as pressure sensitive adhesives and will readily stick to a solid support, whether flexible or rigid.

The surface of the support and the substrate to which the support is adhered may be any known solid material such as metals, such as aluminum, silver, copper, iron and their alloys; porous materials such as paper, wood, leather, and fabrics; Kapton (Registered Trade Mark), organic polymeric materials such as polyolefins, such as polyethylene and polypropylene, fluorocarbon polymers such as polytetrafluoroethylene and polyvinylfluoride, silicone elastomers, silicone resins, polystyrene, polyamides such as nylon, polyesters and acrylic polymers; painted surfaces; siliceous materials such as concrete, bricks, cinderblocks, and glass such as glass cloth; etc. Porous materials such as glass cloth are often impregnated with a substance that will prevent the migration of the PSA from one surface to another surface of the support. It is also well known to chemically treat the surface of a fluorocarbon polymer support to enhance the adhesion of a PSA to said surface.

Solid supports bearing the cured compositions of this invention are reliably adhered to any solid substrate because said compositions possess the desirable combination of high tack and good adhesive strength.

Useful articles which can be prepared with the PSAs of this invention include pressure-sensitive adhesive tapes, labels, emblems and other decorative or informative signs, etc. An especially useful article is one comprising a support, flexible or rigid, that can withstand extreme temperatures, hot and/or cold, and carrying on at least one surface thereof, the polyorganosiloxane PSAs of this invention. Such an article makes full use of the stability at high temperatures and the flexibility at low temperatures that the PSAs of this invention possess.

A preferred article is a pressure-sensitive adhesive tape comprising an impregnated glass cloth, a polyester polymer, or a chemically treated fluorocarbon polymer support carrying on at least one surface thereof the cured compositions of this invention.

The high peel strengths of tapes prepared from the PSA composition of this invention can limit fast unwind speeds because the adhesive coating may resist easy removal from the uncoated backside of the tape. "Legging" phenomena may occur wherein some adhesive coating delaminates and transfers to the backside of the tape. During slitting operations, the improved tear resistance properties of the adhesive film can result in "webbing" phenomena, wherein the adhesive coating resists slitting, resulting in unwanted adhesive delamination along the slit edge.

Both legging and webbing can be eliminated if the adhesive layer is sufficiently primer-bonded to the surface of the tape substrate. A primer which can be used in this invention is SS4191 primer, available from General Electric Company. The SS4191 primer is a toluene solution of a curable dimethyl polysiloxane having a viscosity of 10,000–18,000 centipoise at 25° C. The solids content of the primer is about 29–31%. The SS4191 primer is normally used at a bath concentration of 3–10% solids. The SS4191 primer is used in combination with a catalyst, i.e., SS4192c catalyst, available from General Electric Company, and an accelerator, i.e., SS4259c accelerator, also available from General Electric Company. The SS4192c catalyst is a 50% xylene solution of dibutyl tin diacetate. The SS4259c accelerator is a toluene solution of methyl-2-dimethylaminoethoxy polysiloxane chain-stopped with trimethylsiloxy groups.

The following primer formulation and coating has been found to provide excellent anchorage of the PSA to a substrate:

| | |
|---|---|
| SS4191 primer | 10 parts by weight |
| SS4192c catalyst | 0.5 parts by weight |
| SS4259c accelerator | 0.5 parts by weight |
| Toluene | 72 parts by weight |
| Hexane | 18 parts by weight |

The SS4191 primer is diluted with the toluene and hexane prior to the addition of the catalyst and accelerator. The ingredients are mixed thoroughly. The primer composition is applied to the substrate and cured for 30 seconds at 165° C.

The primer can be applied to the substrate by conventional methods well-known in the art, e.g., spraying, roll coating, dip coating, brushing, and other art-recognized techniques.

The present invention is further directed to pressure sensitive adhesives formed from the cure of the composition of this invention. In addition, the present invention is directed to articles of manufacture containing a solid support having deposited on at least one surface thereof the pressure sensitive adhesive of this invention. The preferred article of manufacture within the scope of this invention is a pressure sensitive tape containing a flexible material having deposited on at least one surface thereof the pressure sensitive adhesive of this invention.

In order that those skilled in the art may better understand the present invention, the following examples are given to illustrate but not to limit the invention which is fully delineated by the appended claims.

In the examples below, the term "PSA-1" refers to the pressure sensitive adhesive composition of component I, "PSA-2" refers to the pressure sensitive adhesive composition of component II, "PSA-3" refers to the pressure sensitive adhesive composition formed in the present invention. The term "MQ resin" refers to a 60% by weight solution in toluene of the resin described hereinabove with reference to components I(A) and II(B). The dimethyl silicone gum used in the examples is a devolatilized silanol-stopped dimethylsilicone gum having a penetration of 100–2500.

In the examples below, peel strength was determined with a Scott tester, using 180° pull at a rate of 12 in/min. Tack was measured on cured, unadhered PSA applied at a thickness of 2 to 3 mil to 1–2 mil Mylar film. A Polyken Probe Tack Tester, manufactured by Testing Machines Incorporated, was fitted with a 0.5 cm probe and operated at a 1 cm/sec rate.

All parts are by weight.

EXAMPLES

Example 1

Preparation of PSA-1

The following ingredients were mixed:

| | |
|---|---|
| MQ resin | 53.1 parts |
| Toluene | 18.7 parts |
| 10% NaOH in water | 0.025 parts |
| Dimethyl siloxane gum | 28.1 parts |

The above mixture was agitated until a completely homogeneous solution was obtained. The mixture was then heated to reflux and cooked at reflux for 2 hours. After the cooking step, all of the water was trapped off, and the mixture was cooled. The solids content was then adjusted to 60% with toluene and the mixture was neutralized to 0–15 ppm acid with 10% $H_3PO_4$.

Example 2

Preparation of PSA-2

The following ingredients were mixed:

| | |
|---|---|
| MQ resin | 16 parts |
| Toluene | 18.55 parts |
| 10% NaOH in water | 0.014 parts |
| Dimethyl siloxane gum | 18.55 parts |

The above mixture was agitated until a completely homogeneous solution was obtained. The mixture was then heated to reflux and cooked at reflux for 2 hours. After the cooking step, all of the water was trapped off, and the mixture was cooled. The solids content was then adjusted to 60% with toluene, and the mixture was neutralized to 0-15 ppm acid with 10% $H_3PO_4$.

Example 3

Preparation of PSA-3

A pressure sensitive adhesive within the scope of this invention was prepared in the following manner. To the PSA-1 prepared in Example 1 above was added 0.04 parts of 30% cerium octoate solution. The cerium octoate was slowly in increments with agitation to get proper dispersion. PSA-2 was then added to the PSA-1/cerium octoate blend and the resulting mixture was blended until uniform. The solids content of the mixture was adjusted to 60% with toluene. Suspended matter in the mixture is removed, e.g., by filtration.

The pressure sensitive adhesive, i.e., PSA-3, had a tack of 800 grams and a peel strength of 40 ounces.

Comparative Example 4

Comparative Example 4 illustrates the preparation of a pressure sensitive adhesive from a single intermediate resin/polymer composition.

A mixture was prepared containing 51.3% MQ resin, 24.5% dimethylsiloxane gum, and 24.5% of xylene. The mixture was agitated until a homogeneous solution was formed. The homogeneous solution was then heated to reflux and cooked at reflux for 2 hours. The water in the cooked solution was then trapped off and the resulting solution cooled. The solids content of the solution was then adjusted to 52.1% with xylene and the solution was allowed to stand overnight. The resulting PSA composition had a solids content of 56% and a viscosity of 40,000 centipoise at 25° C. The PSA had a tack of 550 grams and a peel strength of 25 ounces.

It is clear from the Example 3 and Comparative Example 4 that a pressure sensitive adhesive prepared from two intermediate pressure sensitive adhesives within the scope of this invention results in a PSA having improved tack and peel properties as compared to a PSA prepared from a single PSA composition having an amount of MQ resin equal to that contained in the combination of the two intermediate pressure sensitive adhesives used in Example 3.

Modifications and variations of the present invention are possible in light of the above teachings. It should therefore be understood that changes may be made in the particular embodiments of the invention described which are within the full intended scope of the invention as defined by the appended claims.

What is claimed is:

1. An article of manufacture comprising a solid support having deposited on at least one surface thereof a pressure sensitive adhesive prepared by curing upon said surface a composition comprising a homogeneous mixture of:

I. about 50 to about 95 parts by weight of a first pressure sensitive adhesive composition comprising by weight:
   A) about 49 to about 57% of a solid, benzene soluble resin copolymer consisting essentially of $R_3SiO_{\frac{1}{2}}$ units and $SiO_{4/2}$ units where each R individually is a monovalent hydrocarbon radical containing no more than six carbon atoms, there being from 0.6 to 0.9 inclusive $R_3SiO_{\frac{1}{2}}$ units for every $SiO_{4/2}$ units, at least 95 percent to fall R radicals in I (A) being methyl and the total number of R radicals that have olefinic unsaturation being 0-0.5 percent of all R radicals in I(A); and
   B) about 43 to about 51% of a hydroxyl end-blocked diorganopolysiloxane having the formula:

$$HO-(R^1_2SiO)_x-H$$

wherein each $R^1$ individually is a radial selected from the group consisting of methyl, ethyl, vinyl, and phenyl, at least 95 percent of all $R^1$ radicals being methyl, wherein "x" is a number sufficient to provide a viscosity of from about 100,000 to about 500,000,000 centipoise at 25° C., the total of I(A) and I(B) being 100 parts by weight; and II. about 5 to about 50 parts by weight of a second pressure sensitive adhesive composition comprising by weight:
   (A) about 64 to about 75% of a solid, benzene soluble resin copolymer consisting essentially of $R_3SiO_{\frac{1}{2}}$ units and $SiO_{4/2}$ units where each R individually is a monovalent hydrocarbon radical containing no more than six carbon atoms, thee being from 0.6 to 0.9 inclusive $R_3SiO_{\frac{1}{2}}$ units for every $SiO_{4/2}$ units, at least 95 percent of all R radicals in II (A) being methyl and the total number of R radicals that have olefinic unsaturation being 0-0.5 percent of all R radicals in II (A); and
   (B) about 26 to about 36% of a hydroxyl end-blocked diorganopolysiloxane having the formula:

$$HO-(R^1_2SiO)_2-H$$

wherein each $R^1$ individually is a radical selected from the group consisting of methyl, ethyl, vinyl, and phenyl, at least 95 percent of all $R^1$ radicals being methyl, wherein "x" is a number sufficient to provide a viscosity of from about 100,000 to about 500,000,000 centipoise at 25° C., the total of II(A) and II(B) being 100 parts by weight.

2. An article according to claim 1 further comprising a primer layer, wherein the primer layer is situated on the surface of the support and the pressure sensitive adhesive is situated on the surface of the primer layer, the primer layer comprising a toluene solution of a curable dimethyl polysiloxane having a viscosity of 10,000-18,000 centipoise at 25° C.

3. An article of manufacture comprising a solid support having deposited on at least one surface thereof a pressure sensitive adhesive prepared by curing upon said surface a composition comprising a homogeneous mixture of:

I. about 50 to about 95 parts by weight of a first pressure sensitive adhesive composition comprising by weight:
   (A) about 49 to about 57% of a solid, benzene soluble resin copolymer consisting essentially of $(CH_3)_3SiO_{\frac{1}{2}}$ units and $SiO_{4/2}$ units, there being from 0.6 to 0.9 inclusive $(CH_3)_3SIO_{4/2}$ units for every $SiO_{4/2}$ units; and
   (B) about 43 to about 51% of a hydroxyl end-blocked dimethylpolysiloxane having the formula $$HO-[CH_3)_2SiO)]-H$$

wherein "x" is a number sufficient to provide the polydimethylsiloxane with a viscosity of from about 100,000 to about 500,000,000 centipoise at 25° C., the total of I(A) and I(B) being 100 parts by weight: and II. about 5 to about 50 parts by weight of a second pressure sensitive adhesive composition comprising by weight:

(A) about 64 to about 74% of a solid, benzene soluble resin copolymer consisting essentially of $(CH_3)_3SiO_{\frac{1}{2}}$ units and $SiO_{4/2}$ units, there being from 0.6 to 0.96 inclusive $(CH_3)_3SiO_{\frac{1}{2}}$ units for every $SiO_{4/2}$ units; and (B) about 26 to about 36% of a hydroxyl end-blocked dimethylpolysiloxane having the formula:

$$HO-[(CH_3)_2SiO)_x-H]$$

wherein "x" is a number sufficient to provide the polydimethylsiloxane with a viscosity of from about 100,000 to about 500,000,000 centipoise at 25° C., the total of II(A) and II(B) being 100 parts by weight.

4. An article according to claim 3 further comprising a primer layer, wherein the primer layer is situated on the surface of the support and the pressure sensitive adhesive is situated on the surface of the primer layer, the primer layer comprising of toluene solution of a curable dimethyl polysiloxane having a viscosity of 10,000–18,000 centipoise at 25° C.

5. A pressure sensitive adhesive tape comprising a flexible material having deposited on at least one surface thereof a pressure sensitive adhesive prepared by curing upon said surface a composition comprising a homogeneous mixture of:

I. about 50 to about 95 parts by weight of a first pressure sensitive adhesive composition by weight:

(A) about 49 to about 57% in a solid, benzene soluble resin copolymer consisting essentially of $R_3SiO_{\frac{1}{2}}$ units and $SiO_{4/2}$ units where each R individually is a monovalent hydrocarbon radical containing no more than six carbon atoms, there being from 0.6 to 0.9 inclusive $R_3SiO_{\frac{1}{2}}$ units for every $SiO_{4/2}$ units, at least 95 percent o fall R radicals in I(A) being methyl and the total number of R radicals that have olefinic unsaturation being 0–0.5 percent of all R radicals in I(A); and (B) about 43 to about 51% of a hydroxyl end-blocked diogranopolysiloxane having the formula:

$$HO-(R^1{}_2SiO)_x-H$$

wherein each $R^1$ individually is a radical selected from the group consisting of methyl, ethyl, vinyl, and phenyl, at least 95 percent of all $R^1$ radicals being methyl, wherein "x" is a number sufficient to provide a viscosity of from about 100,000 to about 500,000,000 centipoise at 25° C., the total of I(A) and I(B) being 100 parts by weight; and II. about 5 to about 50 parts by weight of a second pressure sensitive adhesive composition comprising by weight:

(A) about 64 to about 74% of a solid, benzene soluble resin copolymer consisting essentially of $R_3SiO_{\frac{1}{2}}$ units where each R individually is a monovalent hydrocarbon radical containing no more than six carbon atoms, there being from 0.6 to 0.9 inclusive $R_3SiO_{\frac{1}{2}}$ units for every $SiO_{4/2}$ units, at least 95 percent of all R radicals in II(A) being methyl and the total number of R radicals that have olefinic unsaturation being 0–0.5 percent of all R radicals in II(A), and (B) about 26 to about 36% of a hydroxyl end-blocked diorganopolysiloxane having the formula:

$$HO-(R^1{}_2SiO)_x-H$$

wherein each $R^1$ individually is a radical selected from the group consisting of methyl, ethyl, vinyl, and phenyl, at least 95 percent of all $R^1$ radicals being methyl, wherein "x" is a number sufficient to provide a viscosity of from about 100,000 to about 500,000,000 centipoise at 25° C., the total of II(A) and II(B) being 100 parts by weight.

6. A pressure sensitive adhesive tape according claim 5 further comprising a primer layer, wherein the primer layer is situated on the surface of the flexible material and the pressure sensitive adhesive is situated on the surface of the primer layer, the primer layer comprising a toluene solution of a curable dimethyl polysiloxane having a viscosity of 10,000–18,000 centipoise at 25° C.

7. A pressure sensitive adhesive tape comprising a flexible material having deposited on at least one surface thereof a pressure sensitive adhesive prepared by curing upon said surface a composition comprising by weight:

I. about 50 to about 95 parts by weight of a first pressure sensitive adhesive composition comprising by weight:

(A) about 49 to about 57% of a solid, benzene soluble resin copolymer consisting essentially of $(CH_3)_3SiO_{\frac{1}{2}}$ units and $SiO_{\frac{1}{2}}$ units and $SiO_{4/2}$ units, there being from 0.6 to 0.9 inclusive $(CH_3)_3SiO_{\frac{1}{2}}$ units for every $SiO_{4/2}$ units; and (B) about 43 to about 51% of a hydroxyl end-blocked dimethylpolysiloxane having the formula:

$$HO[(CH_3)_2SiO)_x-H]$$

wherein "x" is a number sufficient to provide the polydimethylsiloxane with a viscosity from about 100,000 to about 500,000,000 centipoise at 25° C., the total of I(A) and I(B) being 100 parts by weight; and II. about 5 to about 50 parts by weight of a second pressure sensitive adhesive composition comprising by weight:

(A) about 64 to about 74% of a solid, benzene soluble resin copolymer consisting essentially of $(CH_3)_3SiO_{\frac{1}{2}}$ units and $SiO_{4/2}$ units, there being from 0.6 to 0.9 inclusive $(CH_3)_3SiO_{\frac{1}{2}}$ units for every $SiO_{4/2}$ units; and (B) about 26 to about 36% of a hydroxyl end-blocked dimethylpolysiloxane having the formula:

$$HO-[(CH_3)_2SiO)_x-H]$$

wherein "x" is a number sufficient to provide the polydimethylsiloxane with a viscosity of from about 100,000 to about 500,000,000 centipoise at 25° C., the total of II(A) and II(B) being 100 parts by weight.

8. A pressure sensitive adhesive tape according claim 7 further comprising a primer layer, wherein the primer layer is situated on the surface of the flexible material and the pressure sensitive adhesive is situated on the surface of the primer layer, the primer layer comprising a toluene solution of a curable dimethyl polysiloxane having a viscosity of 10,000–18,000 centipoise at 25° C.

* * * * *